United States Patent
Zhuang et al.

(10) Patent No.: US 11,381,480 B2
(45) Date of Patent: Jul. 5, 2022

(54) CONTROL METHOD, APPARATUS, AND SYSTEM FOR COLLECTING TRAFFIC STATISTICS

(71) Applicant: Huawei Technologies Co., Ltd., Shenzhen (CN)

(72) Inventors: Shunwan Zhuang, Beijing (CN); Peng Zhou, Beijing (CN); Zhenbin Li, Beijing (CN); Hui Ni, Beijing (CN); Nan Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 16/148,429

(22) Filed: Oct. 1, 2018

(65) Prior Publication Data
US 2019/0036794 A1    Jan. 31, 2019

Related U.S. Application Data

(63) Continuation of application No. PCT/CN2017/076964, filed on Mar. 16, 2017.

(30) Foreign Application Priority Data

Mar. 29, 2016 (CN) .......................... 201610185868.2

(51) Int. Cl.
*H04L 43/02* (2022.01)
*H04L 43/026* (2022.01)
(Continued)

(52) U.S. Cl.
CPC ............ *H04L 43/02* (2013.01); *H04L 43/026* (2013.01); *H04L 43/062* (2013.01); *H04L 45/70* (2013.01)

(58) Field of Classification Search
CPC ..... H04L 43/02; H04L 43/026; H04L 43/062; H04L 45/70
See application file for complete search history.

(56) References Cited

U.S. PATENT DOCUMENTS

| 7,254,114 B1 | 8/2007 | Turner et al. |
| 8,953,446 B1 | 2/2015 | Wang et al. |
| (Continued) | | |

FOREIGN PATENT DOCUMENTS

| CN | 1852239 A | 10/2006 |
| CN | 1972295 A | 5/2007 |
| (Continued) | | |

OTHER PUBLICATIONS

Rosen et al, "IANA Registries for BGP Extended Communities", Internet Engineering Task Force (IETF), RFC 7153, Mar. 2014 (Year: 2014).*

(Continued)

*Primary Examiner* — Siming Liu
(74) *Attorney, Agent, or Firm* — Conley Rose, P.C.

(57) ABSTRACT

A control method for collecting traffic statistics includes a control node obtains a statistics collection instruction, where the statistics collection instruction is used to instruct to collect traffic statistics of a target data flow, generates a traffic statistics collection policy according to the statistics collection instruction, where the traffic statistics collection policy includes a matching identifier of the target data flow, a first command, and a second command, and sends the traffic statistics collection policy to a forwarding node. The first command is used to instruct the forwarding node to set a traffic identifier for the target data flow based on the matching identifier, the second command is used to instruct the forwarding node to add traffic generated by a target packet to a traffic statistics collection result corresponding to (Continued)

the traffic identifier which is used to describe the traffic of the target data flow.

22 Claims, 6 Drawing Sheets

(51) Int. Cl.
*H04L 43/062* (2022.01)
*H04L 45/00* (2022.01)

(56) References Cited

U.S. PATENT DOCUMENTS

| | | | |
|---|---|---|---|
| 2004/0088386 | A1 | 5/2004 | Aggarwal |
| 2004/0088403 | A1 | 5/2004 | Aggarwal |
| 2006/0193252 | A1 | 8/2006 | Naseh et al. |
| 2013/0003554 | A1* | 1/2013 | Aybay ............... H04L 43/026 370/235 |
| 2014/0325649 | A1 | 10/2014 | Zhang |
| 2015/0131653 | A1 | 5/2015 | Zaifman et al. |
| 2016/0050132 | A1* | 2/2016 | Zhang ............... H04L 43/026 370/252 |
| 2016/0182300 | A1* | 6/2016 | Mopuri ............. H04L 41/0896 370/235 |
| 2016/0261492 | A1 | 9/2016 | Xiao et al. |

FOREIGN PATENT DOCUMENTS

| | | |
|---|---|---|
| CN | 101043453 A | 9/2007 |
| CN | 101321088 A | 12/2008 |
| CN | 101488925 A | 7/2009 |
| CN | 101631089 A | 1/2010 |
| CN | 101753366 A | 6/2010 |
| CN | 101848132 A | 9/2010 |
| CN | 101917341 A | 12/2010 |
| CN | 103685057 A | 3/2014 |
| CN | 103699074 A | 4/2014 |
| CN | 103746914 A | 4/2014 |
| CN | 104243240 A | 12/2014 |
| CN | 104426768 A | 3/2015 |
| CN | 104468254 A | 3/2015 |
| CN | 104601466 A | 5/2015 |
| CN | 104618377 A | 5/2015 |
| CN | 104639470 A | 5/2015 |
| CN | 104734981 A | 6/2015 |
| CN | 105099916 A | 11/2015 |
| CN | 105871602 A | 8/2016 |
| EP | 1525713 B1 | 5/2013 |
| KR | 20110076307 A | 7/2011 |

OTHER PUBLICATIONS

Marques, et al, "Dissemination of Flow Specication Ruels", RFC 5575, Aug. 2009, Network Working Group.*
Walton, D., et al, "Advertisement of Multiple Paths in BGP," draft-ietf-idr-add-paths-10, Oct. 24, 2014, 8 pages.
Raszuk, R., et al, "Dissemination of Flow Specification Rules for IPv6," draft-ietf-idr-flow-spec-v6-06, Nov. 10, 2014, 9 pages.
Gredler, H., et al, "North-Bound Distribution of Link-State and TE Information using BGP," draft-ietf-idr-ls-distribution-10, Jan. 26, 2015, 45 pages.
Gredler, H., Ed., et al, "North-Bound Distribution of Link-State and TE Information using BGP," draft-ietf-idr-ls-distribution-11, Jun. 4, 2015, 45 pages.
Lougheed, K., et al, "A Border Gateway Protocol (BGP)," RFC 1105, Jun. 1989, 17 pages.
Lougheed, K., et al, "A Border Gateway Protocol (BGP)," RFC 1163, Jun. 1990, 29 pages.
Lougheed, K., et al, "A Border Gateway Protocol 3 (BGP-3)," RFC 1267, Oct. 1991, 35 pages.
Rekhter, Y., et al, "A Border Gateway Protocol 4 (BGP-4)," RFC 4271, Jan. 2006, 104 pages.
Rosen, E., et al, "BGP/MPLS IP Virtual Private Networks (VPNs)," RFC 4364, Feb. 2006, 47 pages.
Bates, T., et al, "BGP Route Reflection: An Alternative to Full Mesh Internal BGP (IBGP)," RFC 4456, Apr. 2006, 12 pages.
Bates, T., et al, "Multiprotocol Extensions for BGP-4," RFC 4760, Jan. 2007, 12 pages.
Scudder, J., et al, "Capabilities Advertisement with BGP-4," RFC 5492, Feb. 2009, 7 pages.
Marques, P., et al, "Dissemination of Flow Specification Rules," RFC 5575, Aug. 2009, 22 pages.
Machine Translation and Abstract of Chinese Publication No. CN101043453, Sep. 26, 2007, 7 pages.
Machine Translation and Abstract of Chinese Publication No. CN103685057, Mar. 26, 2014, 25 pages.
Machine Translation and Abstract of Chinese Publication No. CN104243240, Dec. 24, 2014, 15 pages.
Machine Translation and Abstract of Chinese Publication No. CN105871602, Aug. 17, 2016, 41 pages.
Foreign Communication From A Counterpart Application, Chinese Application No. 201610185868.2, Chinese Office Action dated Jul. 3, 2018, 9 pages.
Foreign Communication From A Counterpart Application, PCT Application No. PCT/CN2017/076964, English Translation of International Search Report dated Jun. 1, 2017, 2 pages.
Foreign Communication From A Counterpart Application, PCT Application No. PCT/CN2017/076964, English Translation of Written Opinion dated Jun. 1, 2017, 7 pages.
Liang, Q., et al. "Carrying Label Information for BGP FlowSpec," XP15112202, draft-liang-idr-bgp-flowspec-label-02, Mar. 21, 2016, 9 pages.
Eddy, W., et al., "Experimental BGP Flow Specification Extensions," draft-eddy-idr-flowspec-exp-00, Aug. 31, 2015, 20 pages.
Foreign Communication From A Counterpart Application, European Application No. 17773059.5, Extended European Search Report dated Nov. 29, 2018, 11 pages.

* cited by examiner

CONTROL METHOD, APPARATUS, AND SYSTEM FOR COLLECTING TRAFFIC STATISTICS

CROSS-REFERENCE TO RELATED APPLICATIONS

This application is a continuation of International Patent Application No. PCT/CN2017/076964 filed on Mar. 16, 2017, which claims priority to Chinese Patent Application No. 201610185868.2 filed on Mar. 29, 2016. The disclosures of the aforementioned applications are hereby incorporated by reference in their entireties.

TECHNICAL FIELD

The present disclosure relates to the field of communications technologies, and in particular, to a control method, apparatus, and system for collecting traffic statistics.

BACKGROUND

In a network, traffic statistics of a data flow between a customer and an autonomous system (AS) may be collected based on Border Gateway Protocol (BGP) route propagation. A manner for collecting traffic statistics based on the BGP route propagation is also referred to as a BGP accounting technology.

In the conventional BGP accounting technology, if traffic statistics of a data flow between a source AS and a destination AS need to be collected, an egress router configured to access the destination AS may first set a specific community attribute for BGP routing information of the data flow, and then send, to an ingress router configured to access the source AS, the BGP routing information carrying the community attribute. After receiving the BGP routing information, the ingress router selects a specific traffic index based on the community attribute carried in the BGP routing information, and correspondingly saves the traffic index and the BGP routing information in a forwarding information base (FIB) of the ingress router. In this way, when processing a packet of the data flow, the ingress router may collect the traffic statistics of the data flow based on the traffic index corresponding to the BGP routing information in a forwarding table.

The inventor finds through research that in the conventional BGP accounting technology, for the data flow whose traffic statistics need to be collected, a skilled person needs to configure the egress router of the data flow such that the configured egress router can set the specific community attribute in the BGP routing information corresponding to the data flow. In addition, the skilled person needs to configure the ingress router of the data flow such that the configured ingress router can set the traffic index for the data flow based on the community attribute carried in the BGP routing information corresponding to the data flow, and collect the traffic statistics of the data flow based on the traffic index. It can be learned that, if traffic statistics of a large quantity of data flows in the network need to be collected, the skilled person needs to manually configure a large quantity of devices. As a result, the skilled person has heavy and complex configuration work.

SUMMARY

To resolve the foregoing technical problems, the application provides a control method, apparatus, and system for collecting traffic statistics in order to reduce a quantity of devices that need to be manually configured by a skilled person for implementing traffic statistics collection, thereby simplifying configuration work of the skilled person.

According to a first aspect, an embodiment of the application provides a control method for collecting traffic statistics. The method includes obtaining, by a control node, a statistics collection instruction, where the statistics collection instruction is used to instruct to collect traffic statistics of a target data flow, generating, by the control node, a traffic statistics collection policy according to the statistics collection instruction, where the traffic statistics collection policy includes a matching identifier of the target data flow, a first command, and a second command, the first command is used to instruct a forwarding node to set a traffic identifier for the target data flow based on the matching identifier, the second command is used to instruct the forwarding node to add traffic generated by a target packet to a traffic statistics collection result corresponding to the traffic identifier, the target packet belongs to the target data flow, and the traffic statistics collection result corresponding to the traffic identifier is used to describe the traffic of the target data flow, and sending, by the control node, the traffic statistics collection policy to the forwarding node.

Optionally, the traffic statistics collection policy is carried in a BGP Flow Specification (BGP FlowSpec) protocol packet, network layer reachability information (NLRI) of the BGP FlowSpec protocol packet carries the matching identifier, and an extended community attribute of the BGP FlowSpec protocol packet carries the first command and the second command.

Optionally, the method further includes receiving, by the control node, statistics collection result report information sent by the forwarding node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet, and recording, by the control node, the traffic statistics collection result corresponding to the traffic identifier as a traffic statistics collection result of the target data flow based on the statistics collection result report information.

Optionally, the statistics collection result report information is carried in a first BGPLink State (BGP-LS) protocol packet.

Optionally, the statistics collection result report information is in a Type-Length-Value (TLV) format. A type value used to indicate traffic statistics collection is written in a type field of the statistics collection result report information, a length value of the statistics collection result report information is written in a length field of the statistics collection result report information, and the interface identifier, the traffic identifier, and the traffic statistics collection result corresponding to the traffic identifier are written in a value field of the statistics collection result report information.

Optionally, the method further includes receiving, by the control node, first interface report information sent by the forwarding node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the first interface report information, and the interface identifier and the interface name are written in a value field of the first interface report information.

Optionally, the method further includes receiving, by the control node, second interface report information sent by the forwarding node, where the second interface report information carries an interface identifier of the target interface and interface description information of the target interface, and the target interface is an interface that is on the forwarding node and that is configured to forward the target packet.

The second interface report information is carried in a third BGP-LS protocol packet.

Optionally, the second interface report information is in a TLV format. A type value used to indicate the interface description information is written in a type field of the second interface report information, a length value of the second interface report information is written in a length field of the third optional information, and the interface identifier and the interface description information are written in a value field of the second interface report information.

According to a second aspect, an embodiment of the application provides a control method for collecting traffic statistics. The method includes receiving, by a forwarding node, a traffic statistics collection policy sent by a control node, where the traffic statistics collection policy carries a matching identifier of a target data flow, a first command, and a second command, the traffic statistics collection policy is generated by the control node according to a statistics collection instruction, and the statistics collection instruction is used to instruct to collect traffic statistics of the target data flow, setting, by the forwarding node, a traffic identifier for the target data flow based on the first command and the matching identifier, and adding, by the forwarding node based on the second command, traffic generated by a target packet to a traffic statistics collection result corresponding to the traffic identifier.

The target packet belongs to the target data flow, and the traffic statistics collection result corresponding to the traffic identifier is used to describe the traffic of the target data flow.

Optionally, the traffic statistics collection policy is carried in a BGP FlowSpec protocol packet, NLRI of the BGP FlowSpec protocol packet carries the matching identifier, and an extended community attribute of the BGP FlowSpec carries the first command and the second command.

Optionally, the setting, by the forwarding node, a traffic identifier for the target data flow based on the first command and the matching identifier includes searching, by the forwarding node, for a forwarding entry corresponding to the matching identifier, and using the forwarding entry corresponding to the matching identifier as a forwarding entry corresponding to the target data flow, and applying, by the forwarding node to the forwarding entry corresponding to the target data flow, the traffic identifier indicated by the first command.

Optionally, the method further includes sending, by the forwarding node, statistics collection result report information to the control node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet.

Optionally, the statistics collection result report information is carried in a first BGP-LS protocol packet.

Optionally, the statistics collection result report information is in a TLV format. A type value used to indicate traffic statistics collection is written in a type field of the statistics collection result report information, a length value of the statistics collection result report information is written in a length field of the statistics collection result report information, and the interface identifier, the traffic identifier, and the traffic statistics collection result corresponding to the traffic identifier are written in a value field of the statistics collection result report information.

Optionally, the method further includes sending, by the forwarding node, first interface report information to the control node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the first interface report information, and the interface identifier and the interface name of the target interface are written in a value field of the first interface report information.

Optionally, the method further includes sending, by the forwarding node, second interface report information to the control node, where the second interface report carries an interface identifier of a target interface and interface description information of the target interface, and the target interface is an interface that is on the forwarding node and that is configured to forward the target packet.

The second interface report information is carried in the third BGP-LS protocol packet.

Optionally, the second interface report information is in a TLV format. A type value used to indicate the interface description information is written in a type field of the second interface report information, a length value of the second interface report information is written in a length field of the third optional information, and the interface identifier and the interface description information are written in a value field of the second interface report information.

According to a third aspect, an embodiment of the application provides a control apparatus for collecting traffic statistics. A control node is deployed in the apparatus, and the apparatus includes an obtaining unit configured to obtain a statistics collection instruction, where the statistics collection instruction is used to instruct to collect traffic statistics of a target data flow, a generation unit configured to generate a traffic statistics collection policy according to the statistics collection instruction, where the traffic statistics collection policy includes a matching identifier of the target data flow, a first command, and a second command, the first command is used to instruct a forwarding node to set a traffic identifier for the target data flow based on the matching identifier, the second command is used to instruct the forwarding node to add traffic generated by a target packet to a traffic statistics collection result corresponding to the traffic identifier, the target packet belongs to the target data flow, and the traffic statistics collection result corresponding to the traffic identifier is used to describe the traffic of the target data flow, and a sending unit configured to send the traffic statistics collection policy to the forwarding node.

Optionally, the traffic statistics collection policy is carried in a BGP FlowSpec protocol packet, NLRI of the BGP FlowSpec protocol packet carries the matching identifier, and an extended community attribute of the BGP FlowSpec protocol packet carries the first command and the second command.

Optionally, the apparatus further includes a first receiving unit configured to receive statistics collection result report information sent by the forwarding node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet, and a recording unit configured to record the traffic statistics collection result corresponding to the traffic identifier as a traffic statistics collection result of the target data flow based on the statistics collection result report information.

Optionally, the statistics collection result report information is carried in a first BGP-LS protocol packet.

Optionally, the statistics collection result report information is in a TLV format. A type value used to indicate traffic statistics collection is written in a type field of the statistics collection result report information, a length value of the first optional information is written in a length field of the statistics collection result report information, and the interface identifier, the traffic identifier, and the traffic statistics collection result corresponding to the traffic identifier are written in a value field of the statistics collection result report information.

Optionally, the apparatus further includes a second receiving unit configured to receive first interface report information sent by the forwarding node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the second optional information, and the interface identifier and the interface name of the target interface are written in a value field of the first interface report information.

Optionally, the apparatus further includes a third receiving unit configured to receive second interface report information sent by the forwarding node, where the second interface report information carries an interface identifier of the target interface and interface description information of the target interface, and the target interface is an interface that is on the forwarding node and that is configured to forward the target packet.

The second interface report information is carried in a third BGP-LS protocol packet.

Optionally, the second interface report information is in a TLV format. A type value used to indicate the interface description information is written in a type field of the second interface report information, a length value of the second interface report information is written in a length field of the second interface report information, and the interface identifier and the interface description information are written in a value field of the second interface report information.

According to a fourth aspect, an embodiment of the application provides a control apparatus for collecting traffic statistics. A forwarding node is deployed in the apparatus, and the apparatus includes a receiving unit configured to receive a traffic statistics collection policy sent by a control node, where the traffic statistics collection policy carries a matching identifier of a target data flow, a first command, and a second command, the traffic statistics collection policy is generated by the control node according to a statistics collection instruction, and the statistics collection instruction is used to instruct to collect traffic statistics of the target data flow, a setting unit configured to set a traffic identifier for the target data flow based on the first command and the matching identifier, and a statistics collection unit configured to add, based on the second command, traffic generated by a target packet to a traffic statistics collection result corresponding to the traffic identifier.

The target packet belongs to the target data flow, and the traffic statistics collection result corresponding to the traffic identifier is used to describe the traffic of the target data flow.

Optionally, the traffic statistics collection policy is carried in a BGP FlowSpec protocol packet, NLRI of the BGP FlowSpec protocol packet carries the matching identifier, and an extended community attribute of the BGP FlowSpec carries the first command and the second command.

Optionally, the setting unit includes a searching subunit configured to search for a forwarding entry corresponding to the matching identifier, and use the forwarding entry corresponding to the matching identifier as a forwarding entry corresponding to the target data flow, and an application subunit configured to apply, to the forwarding entry corresponding to the target data flow, the traffic identifier indicated by the first command.

Optionally, the apparatus further includes a first sending unit configured to send statistics collection result report information to the control node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet.

The statistics collection result report information is carried in a first BGP-LS protocol packet.

Optionally, the statistics collection result report information is in a TLV format. A type value used to indicate traffic statistics collection is written in a type field of the statistics collection result report information, a length value of the statistics collection result report information may be written in a length field of the statistics collection result report information, and the interface identifier, the traffic identifier, and the traffic statistics collection result corresponding to the traffic identifier are written in a value field of the statistics collection result report information.

Optionally, the apparatus further includes a second sending unit configured to send first interface report information to the control node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the first interface report information, and the interface identifier and the interface name of the target interface are written in a value field of the first interface report information.

Optionally, the apparatus further includes a third sending unit configured to send second interface report information to the control node, where the second interface report carries an interface identifier of a target interface and interface description information of the target interface, and the target interface is an interface that is on the forwarding node and that is configured to forward the target packet.

The second interface report information is carried in the third BGP-LS protocol packet.

Optionally, the second interface report information is in a TLV format. A type value used to indicate the interface description information is written in a type field of the second interface report information, a length value of the second interface report information is written in a length field of the second interface report information, and the interface identifier and the interface description information are written in a value field of the second interface report information.

According to a fifth aspect, an embodiment of the application provides a control system for collecting traffic statistics. The system includes a first network device and a second network device, the first network device is the apparatus in any one of implementations of the third aspect, and the second network device is the apparatus in any one of implementations of the fourth aspect.

According to a sixth aspect, an embodiment of the application provides a network device. A control node is configured in the network device, and the network device includes a processor, a memory, a network interface, and a bus system.

The bus system is configured to couple all hardware components of a physical server together.

The network interface is configured to implement a communication connection between the physical server and at least one other network element.

The memory is configured to store a program instruction and data.

The processor is configured to read the instruction and the data that are stored in the memory to perform the following operations obtaining a statistics collection instruction, where the statistics collection instruction is used to instruct to collect traffic statistics of a target data flow, generating a traffic statistics collection policy according to the statistics collection instruction, where the traffic statistics collection policy includes a matching identifier of the target data flow, a first command, and a second command, the first command is used to instruct a forwarding node to set a traffic identifier for the target data flow based on the matching identifier, the second command is used to instruct the forwarding node to add traffic generated by a target packet to a traffic statistics collection result corresponding to the traffic identifier, the target packet belongs to the target data flow, and the traffic statistics collection result corresponding to the traffic identifier is used to describe the traffic of the target data flow, and sending the traffic statistics collection policy to the forwarding node.

According to a seventh aspect, an embodiment of the application provides a network device. A forwarding node is configured in the network device, and the network device includes a processor, a memory, a network interface, and a bus system.

The bus system is configured to couple all hardware components of a physical server together.

The network interface is configured to implement a communication connection between the physical server and at least one other network element.

The memory is configured to store a program instruction and data.

The processor is configured to read the instruction and the data that are stored in the memory to perform the following operations of receiving a traffic statistics collection policy sent by a control node, where the traffic statistics collection policy carries a matching identifier of a target data flow, a first command, and a second command, the traffic statistics collection policy is generated by the control node according to a statistics collection instruction, and the statistics collection instruction is used to instruct to collect traffic statistics of the target data flow, setting a traffic identifier for the target data flow based on the first command and the matching identifier, and adding, based on the second command, traffic generated by a target packet to a traffic statistics collection result corresponding to the traffic identifier.

The target packet belongs to the target data flow, and the traffic statistics collection result corresponding to the traffic identifier is used to describe the traffic of the target data flow.

In comparison with other approaches, the embodiments of the application have the following advantages.

In the embodiments of the application, if the traffic statistics of the target data flow need to be collected, the statistics collection instruction triggered by a user operation may be sent to the control node. In response to the statistics collection instruction, the control node may generate the traffic statistics collection policy and send the traffic statistics collection policy to the forwarding node. Therefore, based on the commands carried in the traffic statistics collection policy, the forwarding node may set the traffic identifier for the target data flow and collect the traffic statistics of the target data flow into the traffic statistics collection result corresponding to the traffic identifier. It can be learned that because the control node delivers the traffic statistics collection policy to all forwarding nodes in a centralized manner, a skilled person only needs to initiate the statistics collection instruction to the control node such that traffic statistics of a large quantity of data flows on all the forwarding nodes can be collected. Therefore, a quantity of devices that need to be manually configured by the skilled person is greatly reduced, thereby simplifying configuration work that needs to be of the skilled person.

BRIEF DESCRIPTION OF DRAWINGS

To describe the technical solutions in some of the embodiments of this application more clearly, the following briefly describes the accompanying drawings describing some of the embodiments. The accompanying drawings in the following description show some embodiments of this application, and a person of ordinary skill in the art may still derive other drawings from these accompanying drawings without creative efforts.

DESCRIPTION OF EMBODIMENTS

Figure 1:
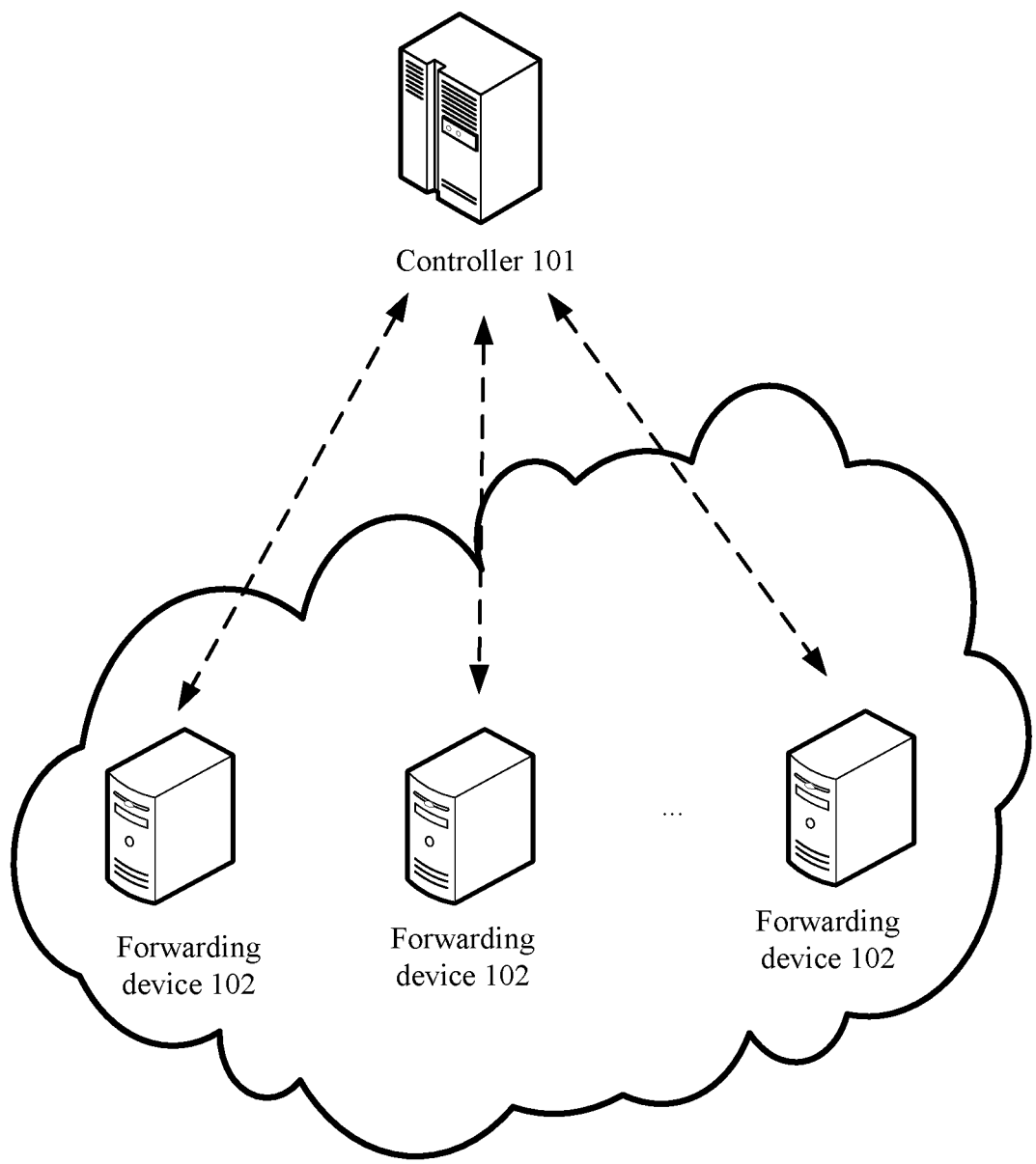
FIG. 1 is a schematic diagram of a system framework related to an application scenario according to an embodiment of the application.

To make a person skilled in the art understand the technical solutions in this application better, the following clearly describes the technical solutions in the embodiments of this application with reference to the accompanying drawings in the embodiments of this application. The described embodiments are merely a part rather than all of the embodiments of this application. All other embodiments obtained by a person of ordinary skill in the art based on the embodiments of this application without creative efforts shall fall within the protection scope of this application.

A target data flow between a source AS and a destination AS, an ingress router configured to access the source AS collects traffic statistics of the target data flow. Further, the ingress router has a traffic index corresponding to the target data flow, and the ingress router collects the traffic statistics of the target data flow into a traffic statistics collection result corresponding to the traffic index. In a conventional BGP accounting technology, to make the ingress router have the traffic index corresponding to the target data flow, both the ingress router and an egress router that is configured to access the destination AS need to be manually configured by a skilled person. After being manually configured by the skilled person, the egress router sets a specific community attribute in BGP routing information of the target data flow such that the egress router sends, to the ingress router, the BGP routing information carrying the community attribute. In addition, after being manually configured by the skilled person and receiving the BGP routing information, the ingress router sets the corresponding traffic index for the target data flow based on the community attribute carried in the BGP routing information. If traffic statistics of a large quantity of data flows in a network need to be collected, the skilled person needs to manually configure an ingress router and an egress router for each data flow. It can be learned that the skilled person needs to manually configure an excessively large quantity of devices. As a result, the skilled person has heavy and complex configuration work.

To resolve the foregoing problem, the embodiments of the application provide a control method, apparatus, and system for collecting traffic statistics. If traffic statistics of a target data flow need to be collected, a control node may obtain a statistics collection instruction triggered by a user operation. In response to the statistics collection instruction, the control node may generate a traffic statistics collection policy and send the traffic statistics collection policy to a forwarding node. Therefore, based on a command carried in the traffic statistics collection policy, the forwarding node may set a traffic identifier for the target data flow and collect the traffic statistics of the target data flow into a traffic statistics collection result corresponding to the traffic identifier. It can be learned that because the control node delivers the traffic statistics collection policy to all forwarding nodes in a centralized manner, a skilled person only needs to initiate the statistics collection instruction to the control node such that traffic statistics of a large quantity of data flows on all the forwarding nodes can be collected. Therefore, a quantity of devices that need to be manually configured by the skilled person is greatly reduced, thereby simplifying configuration work that needs to be of the skilled person.

For example, one of application scenarios of the embodiments of the application may be applied to a network system shown in FIG. 1. A control node and a forwarding node are deployed in the network system. The control node obtains a statistics collection instruction, and the statistics collection instruction is used to instruct to collect traffic statistics of a target data flow. The control node generates a traffic statistics collection policy according to the statistics collection instruction, and the traffic statistics collection policy includes a matching identifier of the target data flow, a first command, and a second command. The control node sends the traffic statistics collection policy to the forwarding node. After the forwarding node receives the traffic statistics collection policy sent by the control node, the forwarding node sets a traffic identifier for the target data flow based on the first command and the matching identifier, and adds, based on the second command, traffic generated by a target packet to a traffic statistics collection result corresponding to the traffic identifier. The target packet belongs to the target data flow, and the traffic statistics collection result corresponding to the traffic identifier is used to describe the traffic of the target data flow.

It may be understood that, for example, physical devices in the network system may include a plurality of forwarding devices 102. For another example, physical devices in the network system may include a controller 101 and a plurality of forwarding devices 102.

In an example, the control node may be implemented as an independent physical device such as an independent controller 101. Similarly, the forwarding node may be implemented as an independent physical device such as any independent forwarding device 102, where each independent forwarding device 102 is a forwarding node.

In another example, the control node may be implemented as a program running on a physical device, for example, a program running on the controller 101 or a program running on any forwarding device 102. Similarly, the forwarding node may be implemented as a program running on a physical device, for example, a program running on a forwarding device 102. It may be understood that one physical device runs only one program. For example, the controller 101 runs only the control node, and each forwarding device 102 runs only one forwarding node. Alternatively, a plurality of different programs may run on a same forwarding device 102. For example, a plurality of different forwarding nodes may run on a same forwarding device 102.

For another example, the control node and the forwarding node may run on a same forwarding device 102.

In still another example, the control node may be implemented as a virtual machine deployed on a physical device, for example, a virtual machine deployed on the controller 101 or a virtual machine running on a forwarding device 102. Similarly, the forwarding node may be implemented as a virtual machine deployed on a physical device, for example, a virtual machine deployed on a forwarding device 102. It may be understood that one physical device may be completely occupied by one virtual machine. For example, the controller 101 is completely occupied by the control node, and each forwarding device 102 is completely occupied by a forwarding node. Alternatively, one physical device may be jointly occupied by a plurality of virtual machines. For example, a same forwarding device 102 is jointly occupied by a plurality of forwarding nodes. For another example, a same forwarding device 102 is jointly occupied by the forwarding node and the control node. In this case, the controller 101 and the forwarding devices 102 may be general-purpose physical servers.

It should be noted that the foregoing application scenario is shown only to facilitate understanding of the embodiments of the application, but is not intended to limit the technical solutions provided in the embodiments of application.

With reference to accompanying drawings, the following describes in detail specific implementations of the control method, apparatus, and system for collecting traffic statistics in the application using embodiments.

Figure 2:
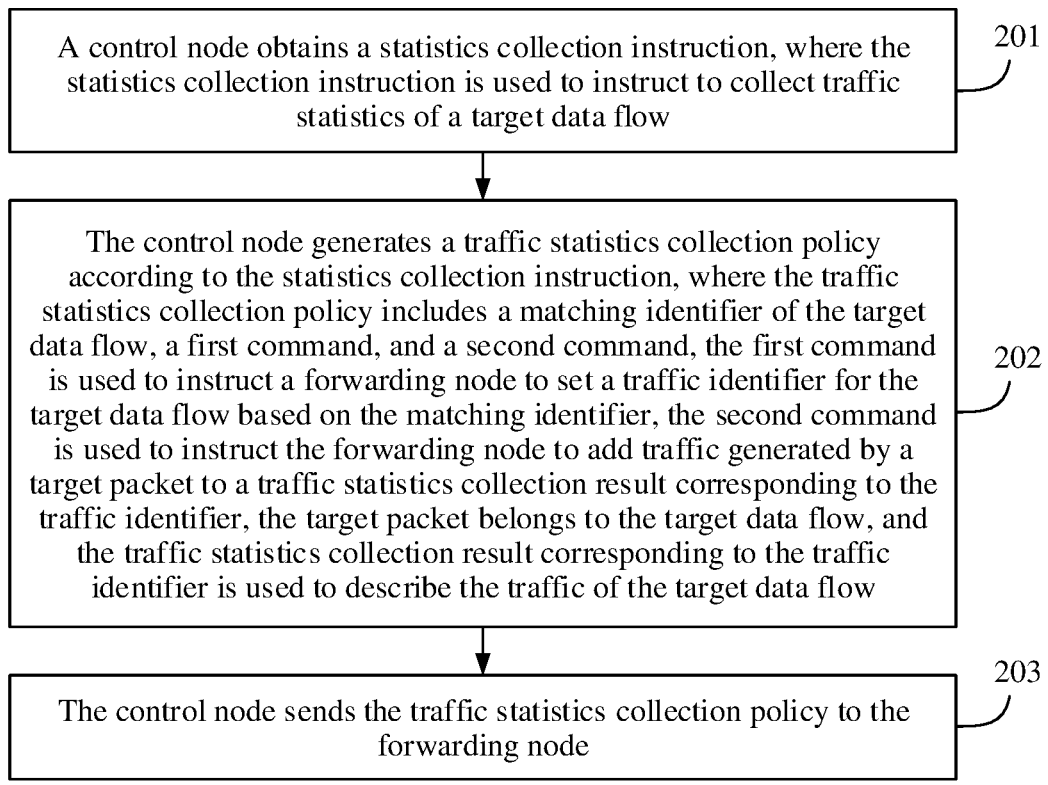
FIG. 2 is a flowchart of a control method for collecting traffic statistics according to an embodiment of the application.

FIG. 2 is a flowchart of a control method for collecting traffic statistics according to an embodiment of the application. The method is described from a perspective of a control node in this embodiment. In this embodiment, for example, the method may include the following steps.

Step 201: The control node obtains a statistics collection instruction, where the statistics collection instruction is used to instruct to collect traffic statistics of a target data flow.

If the traffic statistics of the target data flow need to be collected, a skilled person may initiate the statistics collection instruction to the control node using a device used by the skilled person. After obtaining the statistics collection request, the control node determines, according to the statistics collection instruction, the target data flow corresponding to the statistics collection instruction. The statistics collection instruction is used to instruct to collect the traffic statistics of the target data flow. Further, the statistics collection instruction is used to instruct the control node to send a traffic statistics collection policy corresponding to the target data flow to a forwarding node such that the forwarding node collects the traffic statistics of the target data flow based on the instruction of the traffic statistics collection policy.

In some implementations, the physical device used by the skilled person and a physical device in which the control node is located may be a same physical device. For example, the skilled person may perform an operation on a physical controller in which the control node is located such that the physical controller generates the statistics collection instruction and internally transmits the statistics collection instruction to the control node. In some other implementations, the physical device used by the skilled person and a physical device in which the control node is located may be different physical devices. For example, the skilled person performs an operation on a terminal device of the skilled person, and in response to the operation of the skilled person, the terminal device of the skilled person generates the statistics collection instruction and sends the statistics collection instruction to the control node on a physical controller.

In addition, the statistics collection instruction may be automatically initiated to the control node according to a pre-configured statistics collection rule. For example, the physical controller in which the control node is located has the pre-configured statistics collection rule. If a trigger occasion indicated by the statistics collection rule for the statistics collection instruction is met, the physical controller may generate the statistics collection instruction and internally transmit the statistics collection instruction to the control node.

It may be understood that the statistics collection instruction may instruct the control node to select a target interface to collect the traffic statistics of the target data flow, and the target interface is an interface configured to forward the target data flow. If the statistics collection instruction indicates the target interface, the control node may deliver the traffic statistics collection policy corresponding to the target data flow to the forwarding node on which the target interface is located such that the forwarding node can collect the traffic statistics of the target data flow on the target interface.

It should be noted that the forwarding node may report related information of an interface of the forwarding node to the control node in advance such that the control node feeds back the information to the skilled person. The skilled person may initiate, to the control node based on the interface information reported to the control node, the statistics collection instruction used to instruct to collect the traffic statistics of the target data flow on the target interface. Alternatively, the skilled person may set the statistics collection rule based on the interface information reported to the control node, and the statistics collection rule is used to trigger, on a specific occasion, the statistics collection instruction used to instruct to collect the traffic statistics of the target data flow on the target interface.

In some implementations, the interface information reported by the forwarding node to the control node may include an interface identifier and an interface name of the interface of the forwarding node. Further, before step 201, for example, the method in this embodiment may further include receiving, by the control node, first interface report information sent by the forwarding node, where the first interface report information carries an interface identifier of a target interface and an interface name of the target interface, and the target interface is an interface that is on the forwarding node and that is configured to forward the target packet.

Figure 3:
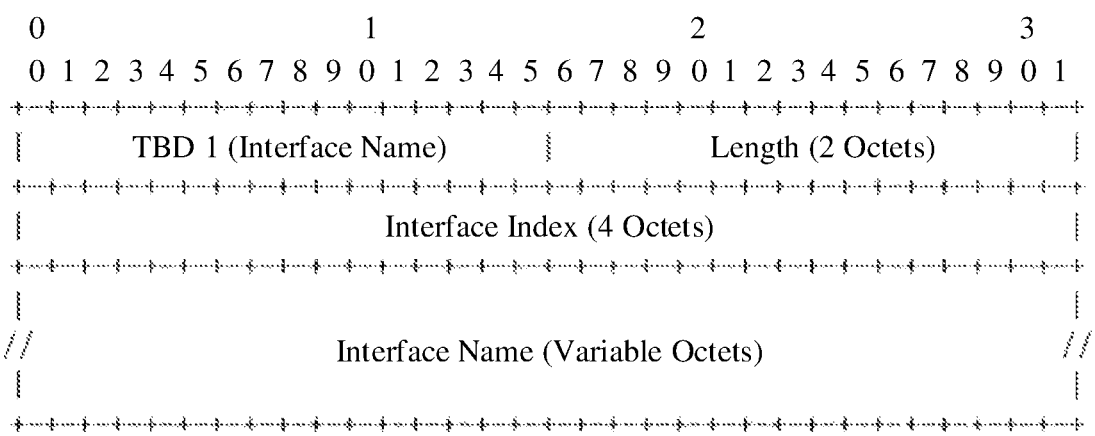
FIG. 3 is a schematic diagram of an example format of interface report information according to an embodiment of the application.

For example, the first interface report information may be reported using a BGP-LS protocol packet. The first interface report information is carried in a first BGP-LS protocol packet sent by the forwarding node to the control node. Further, as shown in FIG. 3, for example, the first interface report information carried in the first BGP-LS protocol packet may be in a TLV format. A type value used to indicate the interface name may be written in a type field, for example, "TBD1 (Interface Name)" in FIG. 3. A length value of the first interface report information may be written in a length field, which occupies 2 bytes, for example, "Length (2 Octets)" in FIG. 3. The interface identifier may be written in a value field, which occupies 4 bytes, for example, "Interface Index (4 Octets)" in FIG. 3. The interface name may be written in another value field, which occupies a maximum of 64 bytes, for example, "Interface Name (variable Octets)" in FIG. 3. The interface identifier may be an interface index, that is, an index value allocated by the forwarding node to the interface of the forwarding node. A same forwarding node allocates different index values to different interfaces. For example, the interface name may be a character string including American Standard Code for Information Interchange (ASCII) characters, and the character string ends with '\0'.

In some other implementations, the interface information reported by the forwarding node to the control node may include an interface identifier and interface description information of the interface of the forwarding node. Further, before step 201, for example, the method in this embodiment may further include receiving, by the control node, second interface report information sent by the forwarding node, where the second interface report information carries an interface identifier of the target interface and interface description information of the target interface, and the target interface is an interface that is on the forwarding node and that is configured to forward the target packet. The interface description information is information used to describe an interface feature. For example, interface description information of an interface on a router A may be "interface connecting a router A to a router B", may be "interface connecting a router A to a user a", or may be "100G interface connecting to a user b for a router A".

Figure 4:
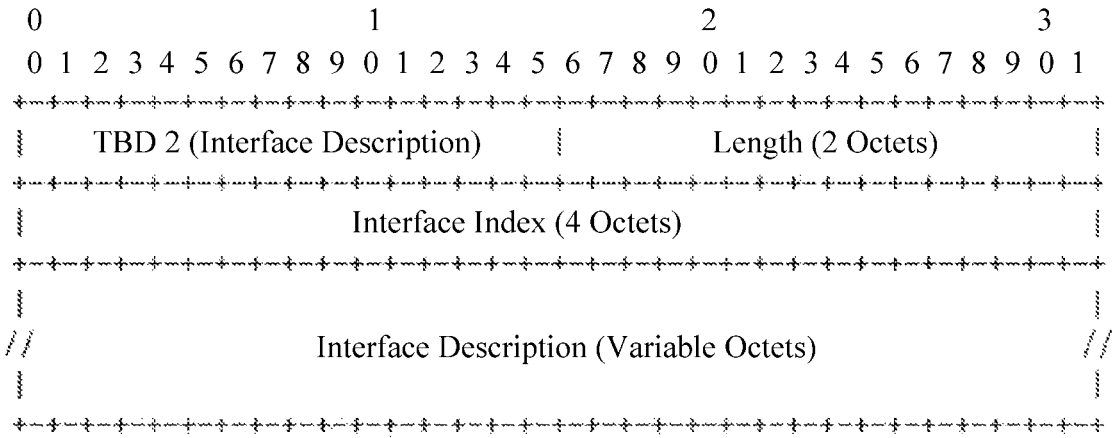
FIG. 4 is a schematic diagram of an example format of another type of interface report information according to an embodiment of the application.

For example, the second interface report information may be reported using a BGP-LS protocol packet. The second interface report information is carried in a second BGP-LS protocol packet sent by the forwarding node to the control node. Further, as shown in FIG. 4, for example, the second interface report information carried in the second BGP-LS protocol packet may be in a TLV format. A type value used to indicate the interface description information may be written in a type field, for example, "TBD 2 (Interface Description)" in FIG. 4. A length value of the second interface report information may be written in a length field, which occupies 2 bytes, for example, "Length (2 Octets)" in FIG. 4. The interface identifier may be written in a value field, which occupies 4 bytes, for example, "Interface Index (4 Octets)" in FIG. 4. The interface description information may be written in another value field, which occupies a maximum of 256 bytes, for example, "Interface Description (variable Octets)" in FIG. 4. The interface identifier may be an interface index, that is, an index value allocated by the forwarding node to the interface of the forwarding node. A same forwarding node allocates different index values to different interfaces. For example, the interface description information may be a character string including ASCII characters, and the character string ends with '\0'.

In still some other implementations, the interface information reported by the forwarding node to the control node may include an interface identifier, an interface name, and interface description information of the interface of the forwarding node. Further, before step 201, for example, the method in this embodiment may further include receiving, by the control node, the first interface report information sent by the forwarding node, and receiving, by the control node, the second interface report information sent by the forwarding node.

Step 202: The control node generates a traffic statistics collection policy according to the statistics collection instruction, where the traffic statistics collection policy includes a matching identifier of the target data flow, a first command, and a second command, the first command is used to instruct a forwarding node to set a traffic identifier for the target data flow based on the matching identifier, the second command is used to instruct the forwarding node to add traffic generated by a target packet to a traffic statistics collection result corresponding to the traffic identifier, the target packet belongs to the target data flow, and the traffic statistics collection result corresponding to the traffic identifier is used to describe the traffic of the target data flow.

Further, the statistics collection instruction indicates the target data flow and the target interface. Therefore, after receiving the statistics collection instruction, the control node may generate, according to the statistics collection instruction, the traffic statistics collection policy corresponding to the target data flow, and send the traffic statistics collection policy to the forwarding node on which the target interface is located.

The traffic statistics collection policy is used to trigger the forwarding node to collect the traffic statistics of the target data flow. Further, the traffic statistics collection policy includes the matching identifier of the target data flow, and the forwarding node can identify the target data flow based on the matching identifier. For example, the matching identifier may be an AS number list, a community list, an extended community list (Ext-Community List), or an Internet Protocol (IP) version 4 (IPv4) prefix list and/or an IP version 6 (IPv6) prefix list. In addition, the traffic statistics collection policy further includes the first command and the second command. The forwarding node sets the traffic identifier for the identified target data flow based on the first command. When forwarding the target packet that belongs to the target data flow, the forwarding node adds, based on the second command, the traffic generated by the target packet to the traffic statistics collection result corresponding to the traffic identifier that has been set.

In some implementations, for example, the traffic statistics collection policy may be delivered using a BGP FlowSpec protocol packet. The traffic statistics collection policy is carried in a BGP FlowSpec protocol packet delivered by the control node to the forwarding node. Further, the BGP FlowSpec protocol packet carries NLRI and an extended community attribute. The NLRI carries the matching identifier, and the extended community attribute carries the first command and the second command. For example, the first command carried in the extended community attribute may be "set-traffic-index". For example, the second command carried in the extended community attribute may be "specify-interface-index".

Step 203: The control node sends the traffic statistics collection policy to the forwarding node.

After the forwarding node receives the traffic statistics collection policy, the forwarding node sets the traffic identifier for the target data flow based on the first command in the traffic statistics collection policy. For example, a specific manner for setting the traffic identifier may be as follows. The forwarding node searches for a forwarding entry corresponding to the matching identifier, and uses the forwarding entry corresponding to the matching identifier as a forwarding entry corresponding to the target data flow, and the forwarding node applies, to the forwarding entry corresponding to the target data flow, the traffic identifier indicated by the first command. For example, a manner for applying the traffic identifier to the forwarding entry may be adding the traffic identifier to the forwarding entry corresponding to the target data flow. The traffic identifier may be an index value allocated to the target data flow, namely, a traffic index.

After the forwarding node sets the traffic identifier for the target data flow, when forwarding the target packet that belongs to the target data flow, the forwarding node adds, based on the second command in the traffic statistics collection policy, the traffic generated by the target packet to the traffic statistics collection result corresponding to the traffic identifier that has been set. Further, based on the instruction of the second command, the forwarding node may configure a command line for the target interface indicated by the traffic statistics collection policy. The command line is used to enable the target interface to collect the traffic statistics of the target data flow. After configuring the command line, if the forwarding node receives the target packet that belongs to the target data flow, the forwarding node searches for the forwarding entry corresponding to the target data flow to forward the target packet. After finding the forwarding entry and forwarding the target packet based on the forwarding entry, the forwarding node identifies the command line corresponding to the target interface configured to forward the target packet, and the forwarding node also identifies the traffic identifier in the forwarding entry. Based on the instruction of the command line, the forwarding node adds the traffic generated by the target packet to the traffic statistics collection result corresponding to the traffic identifier.

In some implementations of this embodiment, the traffic statistics collection result obtained by collecting the traffic statistics of the target data flow on the forwarding node may be uploaded to the control node. In this way, traffic statistics collection results of all data flows may be gathered on the control node and fed back to the skilled person. Further, after step 203, for example, the method in this embodiment may further include receiving, by the control node, statistics collection result report information sent by the forwarding node, and recording, by the control node, the traffic statistics collection result corresponding to the traffic identifier as a traffic statistics collection result of the target data flow based on the statistics collection result report information. The statistics collection result report information may carry an interface identifier of a target interface, the traffic identifier of the target data flow, and the traffic statistics collection result corresponding to the traffic identifier. The target interface is an interface that is on the forwarding node and that is configured to forward the target packet. After the control node receives the statistics collection result report information, the control node determines, based on the interface identifier and the traffic identifier in the statistics collection result report information, that the statistics collection result report information is used to report the traffic statistics collection result of the target data flow in order to record the traffic statistics collection result in the statistics collection result report information as the traffic statistics collection result of the target data flow.

Figure 5:
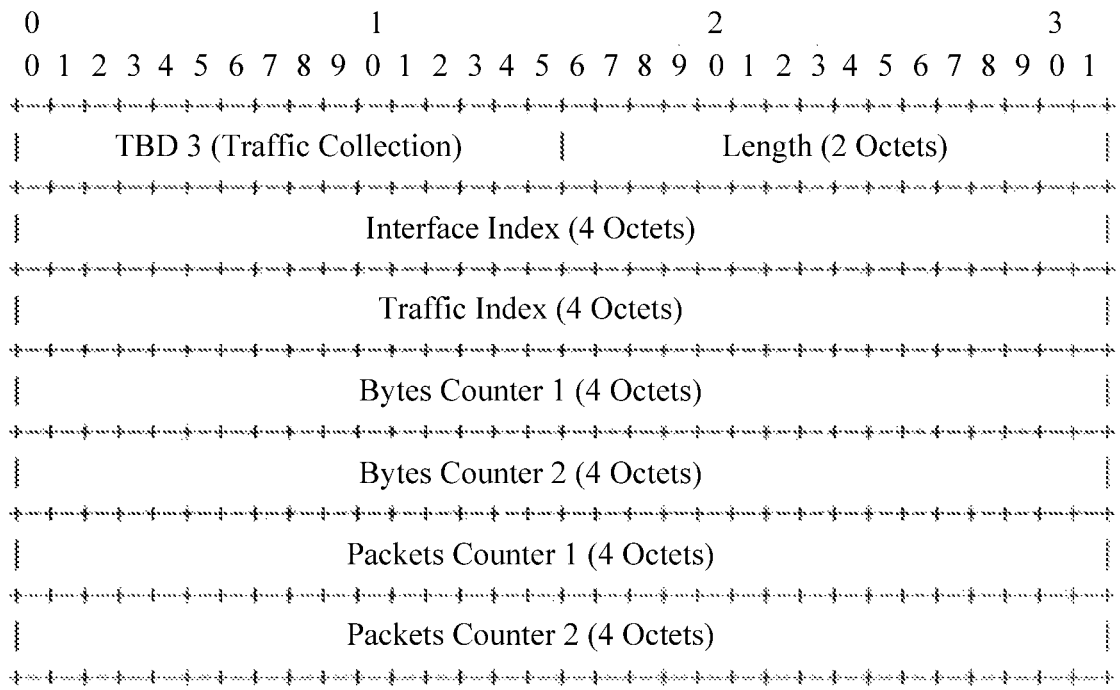
FIG. 5 is a schematic diagram of an example format of statistics collection result report information according to an embodiment of the application.

For example, the statistics collection result report information may be reported using a BGP-LS protocol packet. The statistics collection result report information is carried in a third BGP-LS protocol packet sent by the forwarding node to the control node. Further, as shown in FIG. 5, for example, the statistics collection result report information carried in the third BGP-LS protocol packet may be in a TLV format. A type value used to indicate traffic statistics collection may be written in a type field, for example, "TBD 3 (Traffic Collection)" in FIG. 5. A length value of third optional information may be written in a length field, which occupies 2 bytes, for example, "Length (2 Octets)" in FIG. 5. The interface identifier may be written in a value field, which occupies 4 bytes, for example, "Interface Index (4 Octets)" in FIG. 5. The traffic identifier may be written in another value field, which occupies 4 bytes, for example, "Traffic Index (4 Octets)" in FIG. 5. A most significant bit of the statistics collection result in a unit of byte may be written in still another value field, which occupies 4 bytes, for example, "Bytes Counter 1 (4 Octets)" in FIG. 5. A least significant bit of the statistics collection result in a unit of byte may be written in still another value field, which occupies 4 bytes, for example, "Bytes Counter 2 (4 Octets)" in FIG. 5. A most significant bit of the statistics collection result in a unit of packet may be written in still another value field, for example, "Packets Counter 1 (4 Octets)" in FIG. 5. A least significant bit of the statistics collection result in a unit of packet may be written in still another value field, which occupies 4 bytes, for example, "Packets Counter 2 (4 Octets)" in FIG. 5.

In this embodiment, if the traffic statistics of the target data flow need to be collected, the statistics collection instruction triggered by a user operation may be sent to the control node. In response to the statistics collection instruction, the control node may generate the traffic statistics collection policy and send the traffic statistics collection policy to the forwarding node. Therefore, based on the commands carried in the traffic statistics collection policy, the forwarding node may set the traffic identifier for the target data flow and collect the traffic statistics of the target data flow into the traffic statistics collection result corresponding to the traffic identifier. It can be learned that because the control node delivers the traffic statistics collection policy to all forwarding nodes in a centralized manner, the skilled person only needs to initiate the statistics collection instruction to the control node such that traffic statistics of a large quantity of data flows on all the forwarding nodes can be collected. Therefore, a quantity of devices that need to be manually configured by the skilled person is greatly reduced, thereby simplifying configuration work that needs to be of the skilled person.

Figure 6:
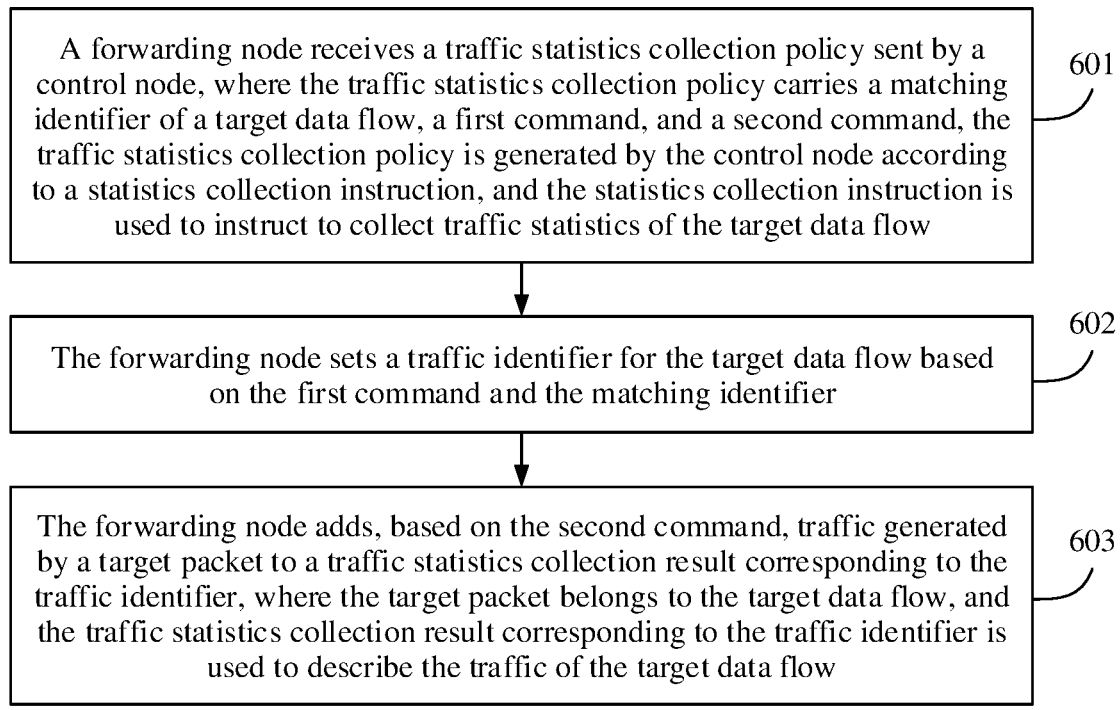
FIG. 6 is a flowchart of a control method for collecting traffic statistics according to an embodiment of the application.

FIG. 6 is a flowchart of a control method for collecting traffic statistics according to an embodiment of the application. The method is described from a perspective of a forwarding node in this embodiment. In this embodiment, for example, the method may include the following steps.

Step 601: The forwarding node receives a traffic statistics collection policy sent by a control node, where the traffic statistics collection policy carries a matching identifier of a target data flow, a first command, and a second command, the traffic statistics collection policy is generated by the control node according to a statistics collection instruction, and the statistics collection instruction is used to instruct to collect traffic statistics of the target data flow.

Step 602: The forwarding node sets a traffic identifier for the target data flow based on the first command and the matching identifier.

Step 603: The forwarding node adds, based on the second command, traffic generated by a target packet to a traffic statistics collection result corresponding to the traffic identifier, where the target packet belongs to the target data flow, and the traffic statistics collection result corresponding to the traffic identifier is used to describe the traffic of the target data flow.

Optionally, the traffic statistics collection policy is carried in a BGP FlowSpec protocol packet, NLRI of the BGP FlowSpec protocol packet carries the matching identifier, and an extended community attribute of the BGP FlowSpec carries the first command and the second command.

Optionally, step 602 may include searching, by the forwarding node, for a forwarding entry corresponding to the matching identifier, and using the forwarding entry corresponding to the matching identifier as a forwarding entry corresponding to the target data flow, and applying, by the forwarding node to the forwarding entry corresponding to the target data flow, the traffic identifier indicated by the first command.

Optionally, the method may further include sending, by the forwarding node, statistics collection result report information to the control node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet.

Optionally, the statistics collection result report information is carried in a first BGP-LS protocol packet.

Optionally, the statistics collection result report information is in a TLV format. A type value used to indicate traffic statistics collection is written in a type field of the statistics collection result report information, a length value of the statistics collection result report information is written in a length field of the statistics collection result report information, and the interface identifier, the traffic identifier, and the traffic statistics collection result corresponding to the traffic identifier are written in a value field of the statistics collection result report information.

Optionally, the method further includes sending, by the forwarding node, first interface report information to the control node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the first interface report information, and the interface identifier and the interface name are written in a value field of the first interface report information.

Optionally, the method may further include sending, by the forwarding node, second interface report information to the control node, where the second interface report carries an interface identifier of a target interface and interface description information of the target interface, and the target interface is an interface that is on the forwarding node and that is configured to forward the target packet.

The second interface report information is carried in the third BGP-LS protocol packet.

Optionally, the second interface report information is in a TLV format. A type value used to indicate the interface description information is written in a type field of the second interface report information, a length value of the second interface report information is written in a length field of the third optional information, and the interface identifier and the interface description information are written in a value field of the second interface report information.

It should be noted that the forwarding node in this embodiment of the application is equivalent to the forwarding node mentioned in the embodiment shown in FIG. 2. For various specific implementations of the method performed by the forwarding node in this embodiment, refer to a detailed description of the embodiment shown in FIG. 2. Details are not described herein again.

In this embodiment, if the traffic statistics of the target data flow need to be collected, the statistics collection instruction triggered by a user operation may be sent to the control node. In response to the statistics collection instruction, the control node may generate the traffic statistics collection policy and send the traffic statistics collection policy to the forwarding node. Therefore, based on the commands carried in the traffic statistics collection policy, the forwarding node may set the traffic identifier for the target data flow and collect the traffic statistics of the target data flow into the traffic statistics collection result corresponding to the traffic identifier. It can be learned that because the control node delivers the traffic statistics collection policy to all forwarding nodes in a centralized manner, a skilled person only needs to initiate the statistics collection instruction to the control node such that traffic statistics of a large quantity of data flows on all the forwarding nodes can be collected. Therefore, a quantity of devices that need to be manually configured by the skilled person is greatly reduced, thereby simplifying configuration work that needs to be of the skilled person.

Figure 7:
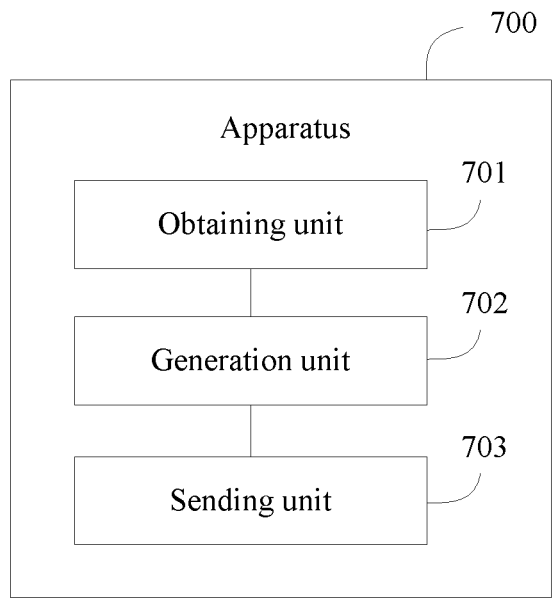
FIG. 7 is a schematic structural diagram of a control apparatus for collecting traffic statistics according to an embodiment of the application.

FIG. 7 is a schematic structural diagram of a control apparatus 700 for collecting traffic statistics according to an embodiment of the application. In this embodiment, a control node is deployed in the apparatus 700. For example, the apparatus 700 may include an obtaining unit 701 configured to obtain a statistics collection instruction, where the statistics collection instruction is used to instruct to collect traffic statistics of a target data flow, a generation unit 702 configured to generate a traffic statistics collection policy according to the statistics collection instruction, where the traffic statistics collection policy includes a matching identifier of the target data flow, a first command, and a second command, the first command is used to instruct a forwarding node to set a traffic identifier for the target data flow based on the matching identifier, the second command is used to instruct the forwarding node to add traffic generated by a target packet to a traffic statistics collection result corresponding to the traffic identifier, the target packet belongs to the target data flow, and the traffic statistics collection result corresponding to the traffic identifier is used to describe the traffic of the target data flow, and a sending unit 703 configured to send the traffic statistics collection policy to the forwarding node.

For example, the apparatus 700 shown in FIG. 7 may be configured to perform the method shown in FIG. 2. Further, the obtaining unit 701 may be configured to perform step 201 in FIG. 2. The generation unit 702 may be configured to perform step 202 in FIG. 2. The sending unit 703 may be configured to perform step 203 in FIG. 2.

Optionally, the traffic statistics collection policy may be carried in a BGP FlowSpec protocol packet, NLRI of the BGP FlowSpec protocol packet carries the matching identifier, and an extended community attribute of the BGP FlowSpec protocol packet carries the first command and the second command.

Optionally, the apparatus 700 may further include a first receiving unit (not shown) configured to receive statistics collection result report information sent by the forwarding node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet, and a recording unit (not shown) configured to record the traffic statistics collection result corresponding to the traffic identifier as a traffic statistics collection result of the target data flow based on the statistics collection result report information.

Optionally, the statistics collection result report information may be carried in a first BGP-LS protocol packet.

Optionally, the statistics collection result report information is in a TLV format. A type value used to indicate traffic statistics collection is written in a type field of the statistics collection result report information, a length value of the first optional information is written in a length field of the statistics collection result report information, and the interface identifier, the traffic identifier, and the traffic statistics collection result corresponding to the traffic identifier are written in a value field of the statistics collection result report information.

Optionally, the apparatus 700 may further include a second receiving unit (not shown) configured to receive first interface report information sent by the forwarding node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the second optional information, and the interface identifier and the interface name of the target interface are written in a value field of the first interface report information.

Optionally, the apparatus 700 may further include a third receiving unit (not shown) configured to receive second interface report information sent by the forwarding node, where the second interface report information carries an interface identifier of the target interface and interface description information of the target interface, and the target interface is an interface that is on the forwarding node and that is configured to forward the target packet.

The second interface report information is carried in a third BGP-LS protocol packet.

Optionally, the second interface report information is in a TLV format. A type value used to indicate the interface description information is written in a type field of the second interface report information, a length value of the second interface report information is written in a length field of the second interface report information, and the interface identifier and the interface description information are written in a value field of the second interface report information.

It should be noted that the control node in the embodiment shown in FIG. 2 is deployed in the apparatus 700 in this embodiment. For various specific implementations of the apparatus 700 in this embodiment, refer to a detailed description of the control node in the embodiment shown in FIG. 2. Details are not described herein again.

In this embodiment, if the traffic statistics of the target data flow need to be collected, the statistics collection instruction triggered by a user operation may be sent to the control node. In response to the statistics collection instruction, the control node may generate the traffic statistics collection policy and send the traffic statistics collection policy to the forwarding node. Therefore, based on the commands carried in the traffic statistics collection policy, the forwarding node may set the traffic identifier for the target data flow and collect the traffic statistics of the target data flow into the traffic statistics collection result corresponding to the traffic identifier. It can be learned that because the control node delivers the traffic statistics collection policy to all forwarding nodes in a centralized manner, a skilled person only needs to initiate the statistics collection instruction to the control node such that traffic statistics of a large quantity of data flows on all the forwarding nodes can be collected. Therefore, a quantity of devices that need to be manually configured by the skilled person is greatly reduced, thereby simplifying configuration work that needs to be of the skilled person.

Figure 8:
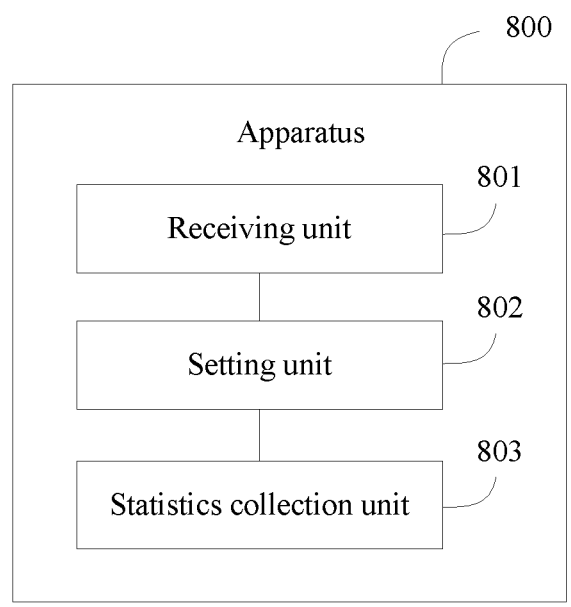
FIG. 8 is a schematic structural diagram of a control apparatus for collecting traffic statistics according to an embodiment of the application.

FIG. 8 is a schematic structural diagram of a control apparatus 800 for collecting traffic statistics according to an embodiment of the application. In this embodiment, a forwarding node is deployed in the apparatus 800. For example, the apparatus 800 may include a receiving unit 801 configured to receive a traffic statistics collection policy sent by a control node, where the traffic statistics collection policy carries a matching identifier of a target data flow, a first command, and a second command, the traffic statistics collection policy is generated by the control node according to a statistics collection instruction, and the statistics collection instruction is used to instruct to collect traffic statistics of the target data flow, a setting unit 802 configured to set a traffic identifier for the target data flow based on the first command and the matching identifier, and a statistics collection unit 803 configured to add, based on the second command, traffic generated by a target packet to a traffic statistics collection result corresponding to the traffic identifier.

The target packet belongs to the target data flow, and the traffic statistics collection result corresponding to the traffic identifier is used to describe the traffic of the target data flow.

For example, the apparatus 800 shown in FIG. 8 may be configured to perform the method shown in FIG. 6. Further, the receiving unit 801 may be configured to perform step 601 in FIG. 6. The setting unit 802 may be configured to perform step 602 in FIG. 6. The statistics collection unit 803 may be configured to perform step 603 in FIG. 6.

Optionally, the traffic statistics collection policy may be carried in a BGP FlowSpec protocol packet, NLRI of the BGP FlowSpec protocol packet carries the matching identifier, and an extended community attribute of the BGP FlowSpec carries the first command and the second command.

Optionally, the setting unit 802 may include a searching subunit (not shown) configured to search for a forwarding entry corresponding to the matching identifier, and use the forwarding entry corresponding to the matching identifier as a forwarding entry corresponding to the target data flow, and an application subunit (not shown) configured to apply, to the forwarding entry corresponding to the target data flow, the traffic identifier indicated by the first command.

Optionally, the apparatus 800 further includes a first sending unit (not shown) configured to send statistics collection result report information to the control node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet.

Optionally, the statistics collection result report information may be carried in a first BGP-LS protocol packet.

Optionally, the statistics collection result report information is in a TLV format. A type value used to indicate traffic statistics collection is written in a type field of the statistics collection result report information, a length value of the statistics collection result report information may be written in a length field of the statistics collection result report information, and the interface identifier, the traffic identifier, and the traffic statistics collection result corresponding to the traffic identifier are written in a value field of the statistics collection result report information.

Optionally, the apparatus 800 may further include a second sending unit (not shown) configured to send first interface report information to the control node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the first interface report information, and the interface identifier and the interface name of the target interface are written in a value field of the first interface report information.

Optionally, the apparatus 800 may further include a third sending unit (not shown) configured to send second interface report information to the control node, where the second interface report carries an interface identifier of a target interface and interface description information of the target interface, and the target interface is an interface that is on the forwarding node and that is configured to forward the target packet.

The second interface report information is carried in the third BGP-LS protocol packet.

Optionally, the second interface report information is in a TLV format. A type value used to indicate the interface description information is written in a type field of the second interface report information, a length value of the second interface report information is written in a length field of the second interface report information, and the interface identifier and the interface description information are written in a value field of the second interface report information.

It should be noted that the forwarding node in the embodiment shown in FIG. 2 is deployed in the apparatus 800 in this embodiment. For various specific implementations of the apparatus 800 in this embodiment, refer to a detailed description of the forwarding node in the embodiment shown in FIG. 2. Details are not described herein again.

In this embodiment, if the traffic statistics of the target data flow need to be collected, the statistics collection instruction triggered by a user operation may be sent to the control node. In response to the statistics collection instruction, the control node may generate the traffic statistics collection policy and send the traffic statistics collection policy to the forwarding node. Therefore, based on the commands carried in the traffic statistics collection policy, the forwarding node may set the traffic identifier for the target data flow and collect the traffic statistics of the target data flow into the traffic statistics collection result corresponding to the traffic identifier. It can be learned that because the control node delivers the traffic statistics collection policy to all forwarding nodes in a centralized manner, a skilled person only needs to initiate the statistics collection instruction to the control node such that traffic statistics of a large quantity of data flows on all the forwarding nodes can be collected. Therefore, a quantity of devices that need to be manually configured by the skilled person is greatly reduced, thereby simplifying configuration work that needs to be of the skilled person.

Figure 9:
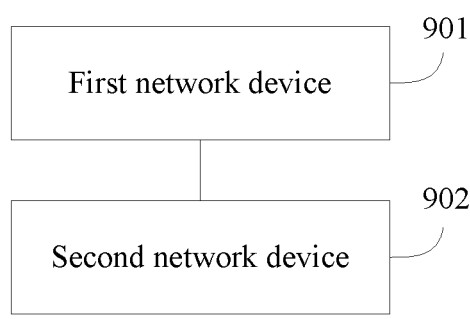
FIG. 9 is a schematic structural diagram of a control system for collecting traffic statistics according to an embodiment of the application.

FIG. 9 is a schematic structural diagram of a control system for collecting traffic statistics according to an embodiment of the application. In this embodiment, the system includes a first network device 902 and a second network device 902. The first network device 901 may be the apparatus 700 in any one of the foregoing implementations, and the second network device 902 may be the apparatus 800 in any one of the foregoing implementations.

It should be noted that the control node mentioned in the embodiment shown in FIG. 2 is configured in the first network device 901 in this embodiment, and the forwarding node mentioned in the embodiment shown in FIG. 2 is configured in the second network device 902 in this embodiment. For various specific implementations of the first network device 901 and the second network device 902 in this embodiment, refer to detailed descriptions of the embodiment shown in FIG. 2. Details are not described in this embodiment again.

In this embodiment, if traffic statistics of a target data flow need to be collected, a statistics collection instruction triggered by a user operation may be sent to the control node. In response to the statistics collection instruction, the control node may generate a traffic statistics collection policy and send the traffic statistics collection policy to the forwarding node. Therefore, based on a command carried in the traffic statistics collection policy, the forwarding node may set a traffic identifier for the target data flow and collect the traffic statistics of the target data flow into a traffic statistics collection result corresponding to the traffic identifier. It can be learned that because the control node delivers the traffic statistics collection policy to all forwarding nodes in a centralized manner, a skilled person only needs to initiate the statistics collection instruction to the control node such that traffic statistics of a large quantity of data flows on all the forwarding nodes can be collected. Therefore, a quantity of devices that need to be manually configured by the skilled person is greatly reduced, thereby simplifying configuration work that needs to be of the skilled person.

Figure 10:
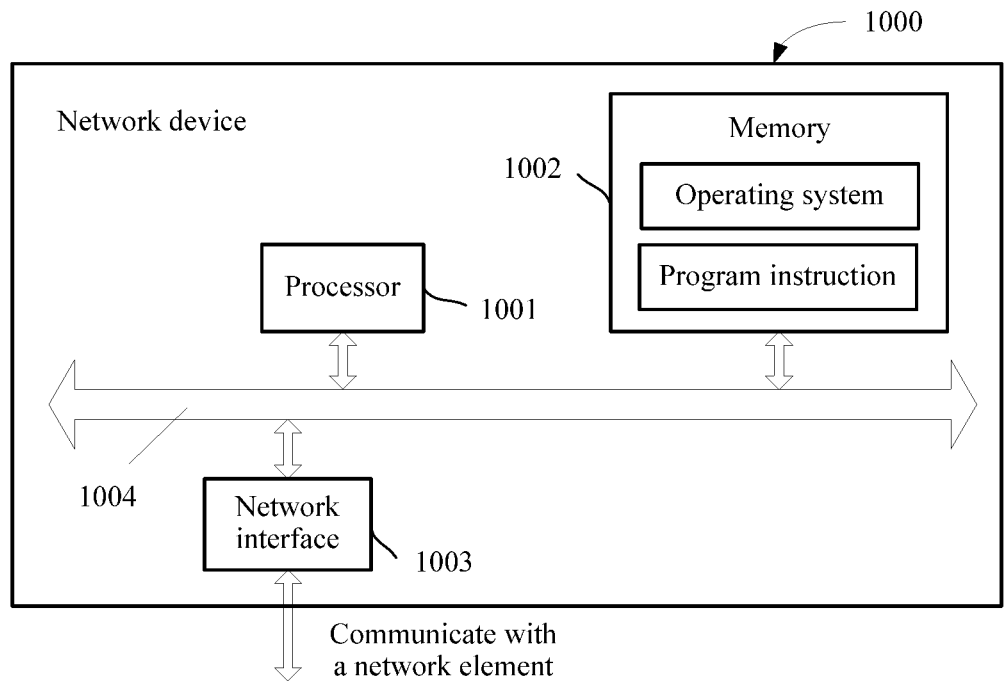
FIG. 10 is a schematic structural diagram of a network device according to an embodiment of the application.

FIG. 10 is a schematic structural diagram of a network device 1000 according to an embodiment of the application. The control node in the embodiment shown in FIG. 2 is deployed in the network device 1000 in this embodiment, and the network device 1000 may be configured to perform the method in the embodiment shown in FIG. 2. The network device 1000 includes a processor 1001, a memory 1002, a network interface 1003, and a bus system 1004.

The bus system 1004 is configured to couple all hardware components of the network device 1000 together.

The network interface 1003 is configured to implement a communication connection between the network device 1000 and at least one other network element through the Internet, a wide area network, a local area network, a metropolitan area network, or another manner.

The memory 1002 is configured to store a program instruction, operating system and data.

The processor 1001 is configured to read the instruction and the data that are stored in the memory 1002 in order to perform the following operations of obtaining a statistics collection instruction, where the statistics collection instruction is used to instruct to collect traffic statistics of a target data flow, generating a traffic statistics collection policy according to the statistics collection instruction, where the traffic statistics collection policy includes a matching identifier of the target data flow, a first command, and a second command, the first command is used to instruct a forwarding node to set a traffic identifier for the target data flow based on the matching identifier, the second command is used to instruct the forwarding node to add traffic generated by a target packet to a traffic statistics collection result corresponding to the traffic identifier, the target packet belongs to the target data flow, and the traffic statistics collection result corresponding to the traffic identifier is used to describe the traffic of the target data flow, and sending the traffic statistics collection policy to the forwarding node.

Optionally, the traffic statistics collection policy is carried in a BGP FlowSpec protocol packet, NLRI of the BGP FlowSpec protocol packet carries the matching identifier, and an extended community attribute of the BGP FlowSpec protocol packet carries the first command and the second command.

Optionally, the processor 1001 may further perform the following operations of receiving statistics collection result report information sent by the forwarding node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet, and recording the traffic statistics collection result corresponding to the traffic identifier as a traffic statistics collection result of the target data flow based on the statistics collection result report information.

Optionally, the statistics collection result report information is carried in a first BGP-LS protocol packet.

Optionally, the statistics collection result report information is in a TLV format. A type value used to indicate traffic statistics collection is written in a type field of the statistics collection result report information, a length value of the statistics collection result report information is written in a length field of the statistics collection result report information, and the interface identifier, the traffic identifier, and the traffic statistics collection result corresponding to the traffic identifier are written in a value field of the statistics collection result report information.

Optionally, the processor 1001 may further perform the following operation of receiving first interface report information sent by the forwarding node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the first interface report information, and the interface identifier and the interface name are written in a value field of the first interface report information.

Optionally, the processor 1001 may further perform the following operation of receiving second interface report information sent by the forwarding node, where the second interface report information carries an interface identifier of the target interface and interface description information of the target interface, and the target interface is an interface that is on the forwarding node and that is configured to forward the target packet.

The second interface report information is carried in a third BGP-LS protocol packet.

Optionally, the second interface report information is in a TLV format. A type value used to indicate the interface description information is written in a type field of the second interface report information, a length value of the second interface report information is written in a length field of the third optional information, and the interface identifier and the interface description information are written in a value field of the second interface report information.

Figure 11:
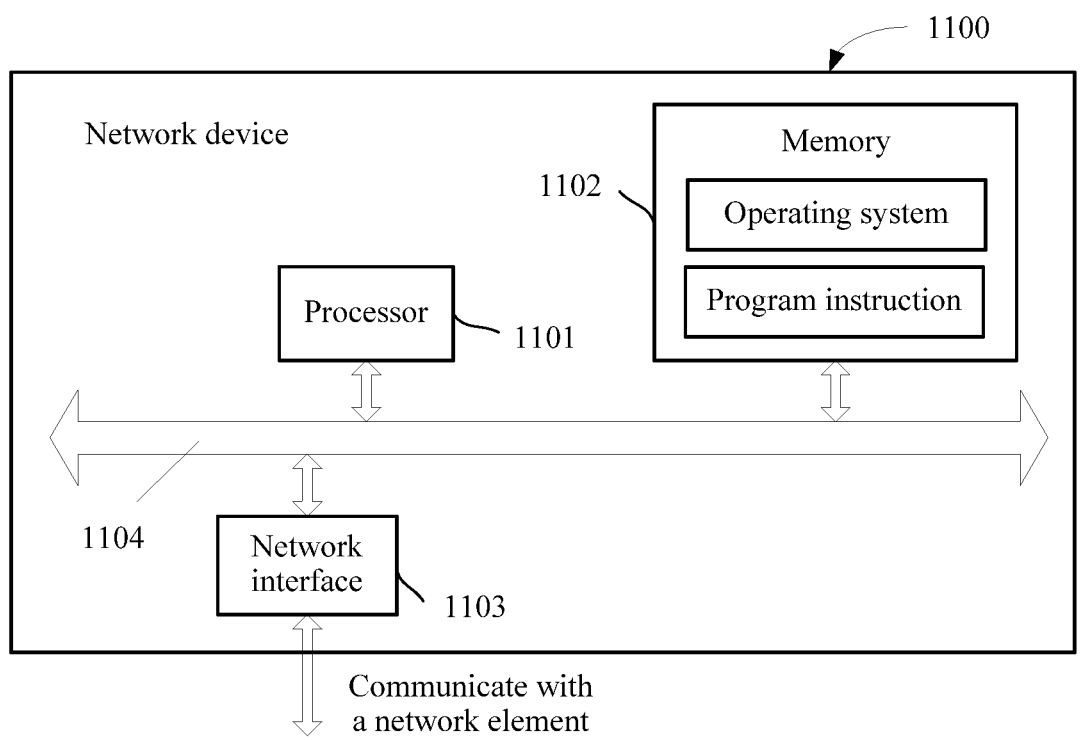
FIG. 11 is a schematic structural diagram of a network device according to an embodiment of the application.

FIG. 11 is a schematic structural diagram of a network device 1100 according to an embodiment of the application. The forwarding node in the embodiment shown in FIG. 6 is deployed in the network device 1100 in this embodiment, and the network device 1100 may be configured to perform the method in the embodiment shown in FIG. 6. The network device 1100 includes a processor 1101, a memory 1102, a network interface 1103, and a bus system 1104.

The bus system 1104 is configured to couple all hardware components of the network device 1100 together.

The network interface 1103 is configured to implement a communication connection between the network device 1100 and at least one other network element through the Internet, a wide area network, a local area network, a metropolitan area network, or another manner.

The memory 1102 is configured to store a program instruction, operating system, and data.

The processor 1101 is configured to read the instruction and the data that are stored in the memory 1102 in order to perform the following operations of receiving a traffic statistics collection policy sent by a control node, where the traffic statistics collection policy carries a matching identifier of a target data flow, a first command, and a second command, the traffic statistics collection policy is generated by the control node according to a statistics collection instruction, and the statistics collection instruction is used to instruct to collect traffic statistics of the target data flow, setting a traffic identifier for the target data flow based on the first command and the matching identifier, and adding, based on the second command, traffic generated by a target packet to a traffic statistics collection result corresponding to the traffic identifier.

The target packet belongs to the target data flow, and the traffic statistics collection result corresponding to the traffic identifier is used to describe the traffic of the target data flow.

Optionally, the traffic statistics collection policy is carried in a BGP FlowSpec protocol packet, NLRI of the BGP FlowSpec protocol packet carries the matching identifier, and an extended community attribute of the BGP FlowSpec carries the first command and the second command.

Optionally, to set the traffic identifier for the target data flow, the processor 1101 may perform the following operations of searching for a forwarding entry corresponding to the matching identifier, and using the forwarding entry corresponding to the matching identifier as a forwarding entry corresponding to the target data flow, and applying, to the forwarding entry corresponding to the target data flow, the traffic identifier indicated by the first command.

Optionally, the processor 1101 may further perform the following operation of sending statistics collection result report information to the control node, where the statistics collection result report information carries an interface identifier of a target interface, the traffic identifier of the target data flow, and the traffic statistics collection result corresponding to the traffic identifier, and the target interface is an interface that is on the forwarding node and that is configured to forward the target packet.

Optionally, the statistics collection result report information is carried in a first BGP-LS protocol packet.

Optionally, the statistics collection result report information is in a TLV format. A type value used to indicate traffic statistics collection is written in a type field of the statistics collection result report information, a length value of the statistics collection result report information is written in a length field of the statistics collection result report information, and the interface identifier, the traffic identifier, and the traffic statistics collection result corresponding to the traffic identifier are written in a value field of the statistics collection result report information.

Optionally, the processor 1101 may further perform the following operation of sending first interface report information to the control node, where the first interface report information carries an interface identifier of a target interface and an interface name of the target interface, and the target interface is an interface that is on the forwarding node and that is configured to forward the target packet.

The first interface report information is carried in a second BGP-LS protocol packet.

Optionally, the first interface report information is in a TLV format. A type value used to indicate the interface name is written in a type field of the first interface report information, a length value of the first interface report information is written in a length field of the first interface report information, and the interface identifier and the interface name of the target interface are written in a value field of the first interface report information.

Optionally, the processor 1101 may further perform the following operation of sending second interface report information to the control node, where the second interface report information carries an interface identifier of a target interface and interface description information of the target interface, and the target interface is an interface that is on the forwarding node and that is configured to forward the target packet.

The second interface report information is carried in the third BGP-LS protocol packet.

Optionally, the second interface report information is in a TLV format. A type value used to indicate the interface description information is written in a type field of the second interface report information, a length value of the second interface report information is written in a length field of the third optional information, and the interface identifier and the interface description information are written in a value field of the second interface report information.

The word "first" in names such as the "first BGP-LS protocol packet" and the "first optional information" mentioned in the embodiments of the application is merely used as a name identifier, and does not mean being the first in a sequence. This rule is also applicable to the word "second," "third," and the like.

It should be noted that the processor in the embodiments of the application may be an integrated circuit chip and has a signal processing capability. In an implementation process, steps in the foregoing methods can be implemented using a hardware integrated logical circuit in the processor, or using instructions in a form of software. These instructions may be implemented and controlled through cooperation of the processor, and are used to perform the methods disclosed in the embodiments of the application. The processor may be a general purpose processor, a digital signal processor (DSP), an application-specific integrated circuit, a field programmable gate array (FPGA) or another programmable logical device, a discrete gate or transistor logic device, or a discrete hardware component.

The general purpose processor may be a microprocessor or the processor may be any conventional processor, decoder, or the like. The steps of the method disclosed with reference to the embodiments of the application may be directly performed by a hardware processor, or may be performed using a combination of hardware in the processor and a software module. A software module may be located in a mature storage medium in the art, such as a random access memory, a flash memory, a read-only memory, a programmable read-only memory, an electrically erasable programmable memory, a register, or the like.

In addition, it should be noted that the bus system may further include a power bus, a control bus, a status signal bus, and the like, in addition to a data bus. However, for clear description, various types of buses in FIG. 8 and FIG. 9 are marked as the bus system.

From the foregoing descriptions of the implementations, a person skilled in the art may clearly understand that some or all steps of the methods in the embodiments may be implemented by software in addition to a universal hardware platform. Based on such an understanding, the technical solutions of the application essentially or the part contributing to the other approaches may be implemented in a form of a software product. The software product may be stored in a storage medium, such as a read-only memory (ROM)/random access memory (RAM), a magnetic disk, or an optical disc, and includes several instructions for instructing a computer device (which may be a personal computer, a server, or a network device such as media gateway) to perform the methods described in the embodiments or some parts of the embodiments of the application.

It should be noted that the embodiments in this specification are all described in a progressive manner, for same or similar parts in the embodiments, reference may be made to these embodiments, and each embodiment focuses on a difference from other embodiments. Especially, method and apparatus embodiments are basically similar to a system embodiment, and therefore is described briefly. For related parts, refer to partial descriptions in the system embodiment. The described device and system embodiments are merely examples. The modules described as separate parts may or may not be physically separate, and parts displayed as modules may or may not be physical modules, may be located in one position, or may be distributed on a plurality of network units. Some or all the modules may be selected based on actual requirements to achieve the objectives of the solutions of the embodiments. A person of ordinary skill in the art may understand and implement the embodiments of the application without creative efforts.

The foregoing descriptions are merely example implementations of the application, but are not intended to limit the protection scope of the application. It should be noted that a person of ordinary skill in the art may make certain improvements and polishing without departing from the principle of the application and the improvements and polishing shall fall within the protection scope of the application.

What is claimed is:

1. A method implemented by a control node, comprising:
receiving, by the control node, a statistics collection instruction triggered by a user operation, wherein the control node is communicatively coupled to a plurality of forwarding nodes;
generating, by the control node in response to the user operation, correspondence between Border Gateway Protocol (BGP) attribute information and action information, wherein the correspondence indicates that one of the forwarding nodes is to perform an action associated with the action information to packets identified by the BGP attribute information, and wherein the action associated with the action information comprises setting a traffic identifier for the packets identified by the BGP attribute information; and
sending, by the control node, a Border Gateway Protocol Flow Specification (BGP FlowSpec) packet comprising the correspondence to the forwarding nodes.

2. The method of claim 1, wherein the BGP attribute information comprises one or more autonomous system (AS) numbers.

3. The method of claim 1, wherein the BGP attribute information comprises a community list.

4. The method of claim 1, wherein the BGP attribute information comprises an extended community list.

5. The method of claim 1, wherein the BGP attribute information comprises an Internet Protocol version 4 (IPv4) prefix list or an Internet Protocol version 6 (IPv6) prefix list.

6. The method of claim 1, wherein the action is associated with traffic statistics.

7. The method of claim 1, further comprising sending interface information of an interface of the one of the forwarding nodes, wherein the interface information indicates an interface where the action is to be performed.

8. The method of claim 1, wherein the traffic identifier comprises an index value allocated to a target data flow, and wherein the index value comprises 4 bytes of the BGP FlowSpec packet.

9. A control node, comprising:
a memory configured to store computer-readable instructions; and
a processor configured to implement the computer-readable instructions to:
receive, by the control node, a statistics collection instruction triggered by a user operation, wherein the control node is communicatively coupled to a plurality of forwarding nodes;
generate, by the control node in response to the user operation, correspondence between Border Gateway Protocol (BGP) attribute information and action information, wherein the correspondence indicates that one of the forwarding nodes is to perform an action associated with the action information to packets identified by the BGP attribute information, and wherein the action associated with the action information comprises a traffic identifier for the packets identified by the BGP attribute information; and
send, by the control node, a Border Gateway Protocol Flow Specification (BGP FlowSpec) packet comprising the correspondence to the forwarding nodes.

10. The control node of claim 9, wherein the BGP attribute information comprises one or more autonomous system (AS) numbers.

11. The control node of claim 9, wherein the BGP attribute information comprises a community list.

12. The control node of claim 9, wherein the BGP attribute information comprises an extended community list.

13. The control node of claim 9, wherein the BGP attribute information comprises an Internet Protocol version 4 (IPv4) prefix list or an Internet Protocol version 6 (IPv6) prefix list.

14. The control node of claim 9, wherein the action is associated with traffic statistics.

15. The control node of claim 9, wherein the processor is further configured to send interface information of an interface of the one of the forwarding nodes, and wherein the interface information indicates an interface where the action is to be performed.

16. The control node of claim 9, wherein the traffic identifier comprises an index value allocated to a target data flow, and wherein the index value comprises 4 bytes of the BGP FlowSpec packet.

17. A computer program product comprising computer-executable instructions stored on a non-transitory computer-readable medium that, when executed by a processor, cause a control node to:
receive, a statistics collection instruction triggered by a user operation, wherein the control node is communicatively coupled to a plurality of forwarding nodes;
generate, in response to the user operation, a correspondence between Border Gateway Protocol (BGP) attribute information and action information, wherein the correspondence indicates that one of the forwarding nodes is to perform an action associated with the action information to packets identified by the BGP attribute information, and wherein the action associated with the action information comprises setting a traffic identifier for the packets identified by the BGP attribute information; and
send a Border Gateway Protocol Flow Specification (BGP FlowSpec) packet comprising the correspondence to the forwarding nodes.

18. The computer program product of claim 17, wherein the BGP attribute information comprises one or more autonomous system (AS) numbers.

19. The computer program product of claim 17, wherein the BGP attribute information comprises a community list or an extended community list.

20. The computer program product of claim 17, wherein the BGP attribute information comprises an Internet Protocol version 4 (IPv4) prefix list.

21. The computer program product of claim 17, wherein the BGP attribute information comprises an Internet Protocol version 6 (IPv6) prefix list.

22. The computer program product of claim 17, wherein the traffic identifier comprises an index value allocated to a target data flow, and wherein the index value comprises 4 bytes of the BGP FlowSpec packet.

* * * * *